United States Patent
Hennum et al.

(10) Patent No.: US 7,689,910 B2
(45) Date of Patent: Mar. 30, 2010

(54) PROCESSING SEMANTIC SUBJECTS THAT OCCUR AS TERMS WITHIN DOCUMENT CONTENT

(75) Inventors: Erik F. Hennum, San Francisco, CA (US); Michael Priestley, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 11/048,367

(22) Filed: Jan. 31, 2005

(65) Prior Publication Data

US 2006/0173821 A1 Aug. 3, 2006

(51) Int. Cl.
G06F 17/21 (2006.01)
G06F 17/24 (2006.01)

(52) U.S. Cl. .................. 715/255; 715/200; 715/259; 715/260; 715/261; 715/264; 707/100; 707/104.1

(58) Field of Classification Search .......... 715/200, 715/255, 259, 260, 261, 264; 707/100, 104.1
See application file for complete search history.

(56) References Cited

U.S. PATENT DOCUMENTS

| | | | |
|---|---|---|---|
| 5,708,822 A | 1/1998 | Wical | |
| 6,101,515 A | 8/2000 | Wical et al. | |
| 6,363,378 B1 | 3/2002 | Conklin et al. | |
| 6,405,190 B1 | 6/2002 | Conklin | |
| 6,418,448 B1 * | 7/2002 | Sarkar | 707/104.1 |
| 7,124,364 B2 * | 10/2006 | Rust et al. | 715/260 |
| 2001/0016851 A1 * | 8/2001 | Gramsamer et al. | 707/200 |
| 2002/0143828 A1 * | 10/2002 | Montero et al. | 707/533 |
| 2003/0221171 A1 * | 11/2003 | Rust et al. | 715/532 |
| 2004/0186705 A1 * | 9/2004 | Morgan et al. | 704/9 |
| 2004/0221228 A1 * | 11/2004 | Day et al. | 715/513 |

FOREIGN PATENT DOCUMENTS

| WO | WO 01/24045 A2 | 5/2001 |
|---|---|---|
| WO | WO 01/24046 A2 | 5/2001 |

OTHER PUBLICATIONS

"Encode Enterprise Specific Search Terms Conforming to Document Interchange Architecture," *IBM Technical Disclosure Bulletin*, vol. 33, No. 5, Oct. 1990, p. 172.

"Identify the Enterprise Specific Search Terms Table in Document Interchange Architecture," *IBM Technical Disclosure Bulletin*, vol. 33, No. 5, Oct. 1990.

Erik Hennum, "Specializing domains in DITA. Feature provides for great flexibility in extending and reusing information types," *IBM developer Works*, disclosed May, 1, 2002, updated Jun. 24, 2003, 11 pages.

(Continued)

Primary Examiner—Joshua D Campbell
(74) Attorney, Agent, or Firm—William K. Konrad; Konrad Raynes and Victor LLP

(57) ABSTRACT

A method, apparatus and program storage device for delimiting words is provided and requires adding an extensible vocabulary markup to a plurality of markup languages, wherein the plurality of markup languages comprises a knowledge representation, and processing a provided term from one or more vocabularies for use in the knowledge representation.

20 Claims, 9 Drawing Sheets

OTHER PUBLICATIONS

Don R. Day et al., Toward portable technical information, *IBM developer Works*, disclosed Mar. 1, 2001, updated Jun. 24, 2003, 10 pages.

Kanemoto, H. et al., An Efficiently Updatable Index Scheme for Structured Documents, Ninth International Workshop on Database and Expert systems Applications, Aug. 26-28, 1998, pp. 991-996.

Deutsch, A. et al., "A Query Language for XML," Computer Networks, Elsevier Science Publisher B.V., vol. 31, No. 11-16, pp. 1155-1169, published May 17, 1999.

Dobson, S. et al., "Lightweight Databases," Computer Networks and ISDN Systems, North Holland Publishing, vol. 27, No. 6, Apr. 1, 1995, 10 pages.

Chinese Office Action for Application No. 2006100066358, dated June 12, 2009, 5 pp.

* cited by examiner

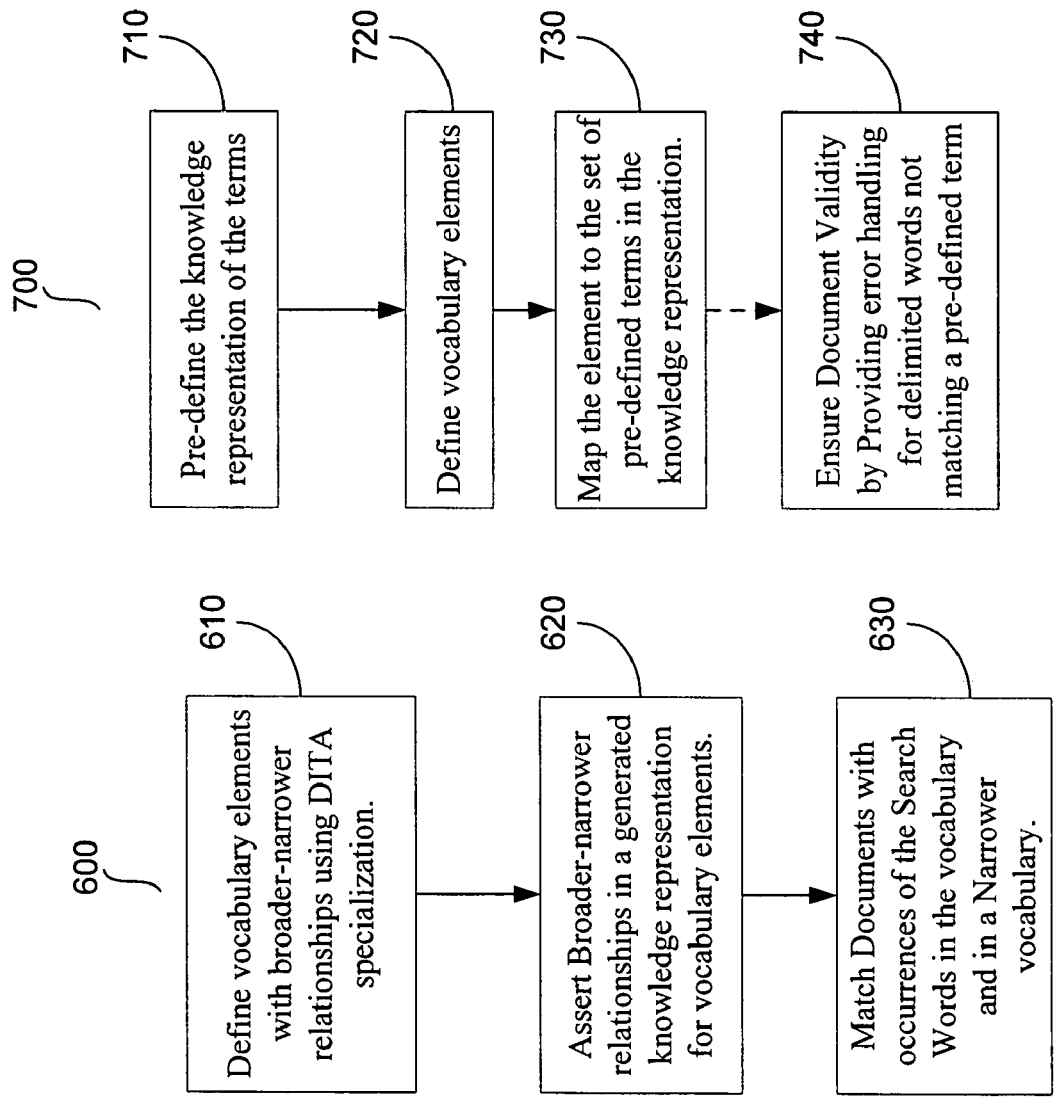

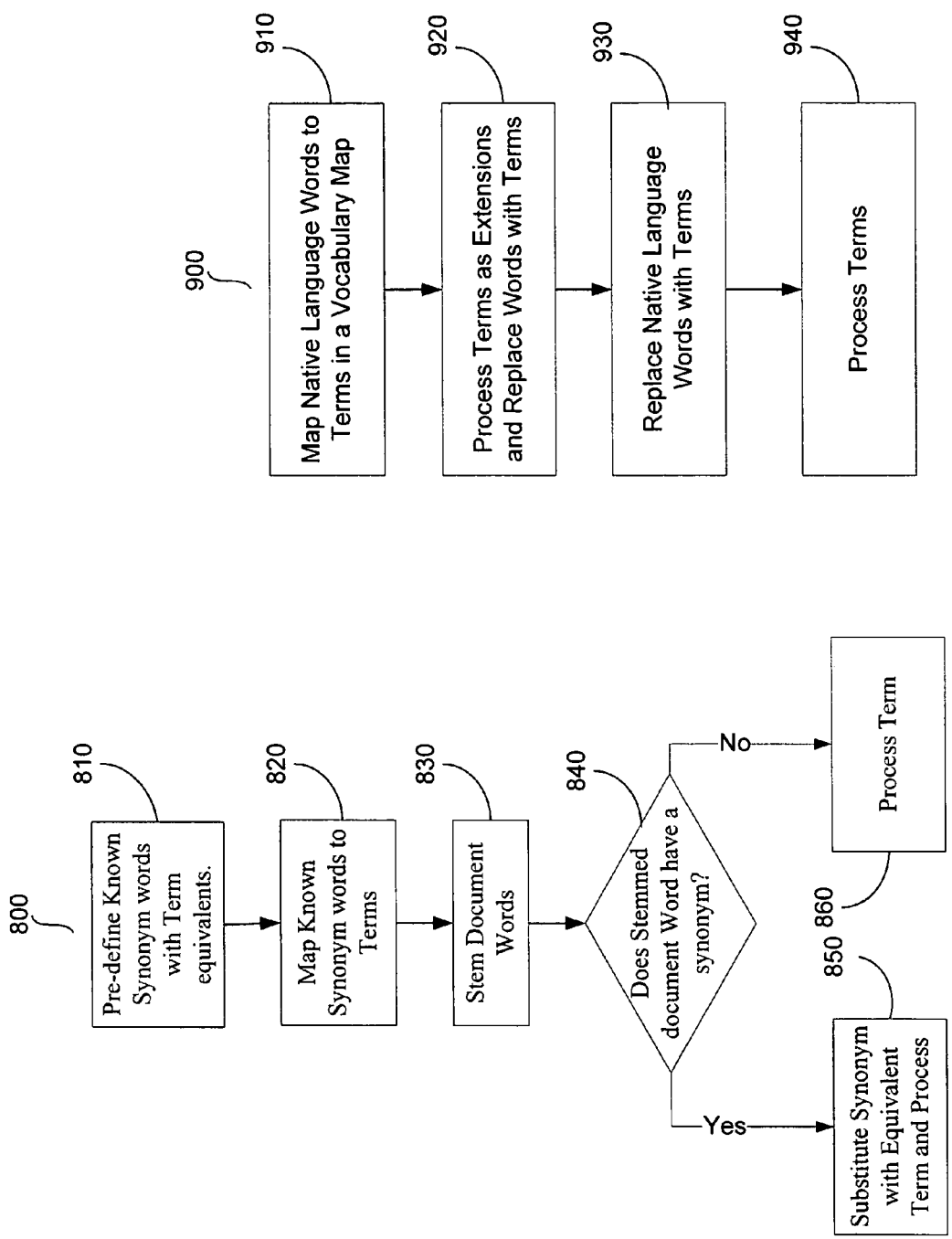

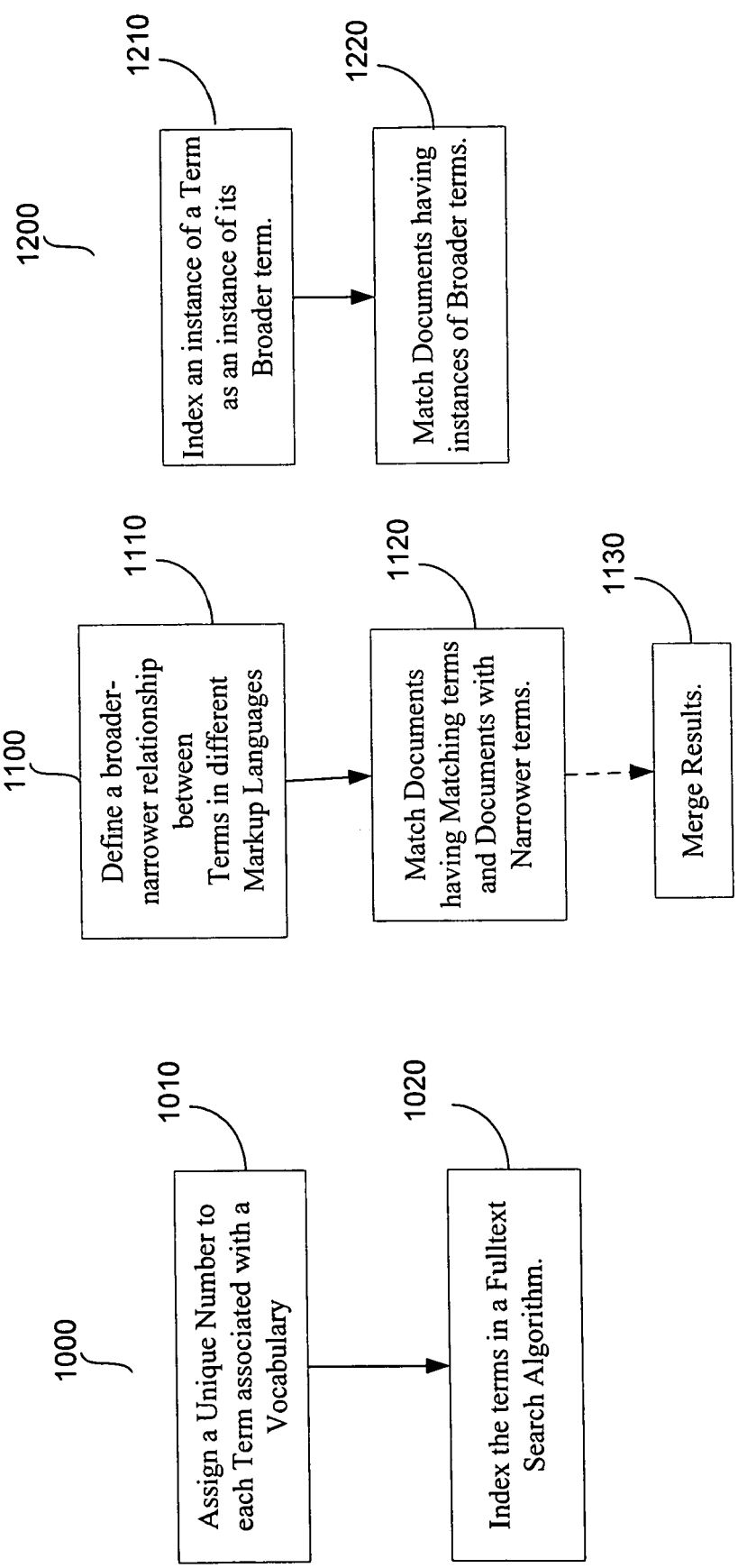

PROCESSING SEMANTIC SUBJECTS THAT OCCUR AS TERMS WITHIN DOCUMENT CONTENT

BACKGROUND OF THE INVENTION

1. Field of the Invention

This disclosure relates in general to semantic searching in content management applications, and more particularly to a method, apparatus and program storage device for processing semantic subjects that occur as terms within document content.

2. Description of Related Art

Content management applications manage collections of data and are used to save data search and retrieval time. In computer applications a client process runs on a local or client computer that accesses and updates databases located, for example, on a remote or server computer running a server process. Client processes and server processes may be connected together through a network or collection of networks, such as the Internet. An example of a client process is a Web browser or spreadsheet program and an example of a server process is a Web server or database server.

The Internet exchanges information via hypertext transfer protocol (HTTP). The use of the Internet computer network for commercial and noncommercial uses is expanding rapidly. Via its networks, the Internet computer network enables many users in locations around the world to access information stored in data sources (e.g., content management applications) stored in different locations.

The World Wide Web (i.e., the "WWW" or the "Web") is a hypertext information and communication system used on the Internet computer network with data communications operating according to a client/server model. Typically, a Web client computer will request data stored in data sources from a Web server computer, at which Web server software resides. The Web server software interacts with an interface connected to, for example, a content management application system connected to other data sources. Computer programs residing at the Web server computer can then retrieve the data and transmit the data to the client computer. Retrieved data can be any type of information, including database data, static data, HTML data, or dynamically generated data.

Accompanying the growing popularity of the Internet and the World Wide Web (also known as "WWW" or the "Web") is the fast growing demand for Web access to databases. Thus, database searches are becoming increasingly important. And as data continues to grow, it becomes more difficult to provide simple menu-based navigation systems to information, and database searching by the user is the more efficient way to find information.

To address this demand, web content is authored in extensible markup language (XML) that provides users the capability to define their own tags. A tag is a keyword that identifies what the data is which is associated with the tag, and is typically composed of a character string enclosed in special characters, e.g., whether given text is a heading or a paragraph. This makes XML a very powerful language that enables users to easily define a data model, which may change from one document to another, which provides a way for an author to create a custom markup language to suit a particular kind of document.

XML can be likened to a Hypertext Markup Language (HTML) file because both are based on the standard generalized markup language (SGML) and use tags to convey basic information about the structure of a web document. The style and logic of HTML documents are hardcoded, however, and a limited number of HTML element tags are available. As a result, HTML tags do not define the meaning of every page element. In XML, each document is an object, and each element of the document is an object. The logical structure of the document typically is specified in XML grammar such as a Document Type Definition (DTD), XML Schema Definition, or Relax NG grammar. A DTD may be used by the author to define a grammar for a set of tags for the document so that a given application may validate the proper use of the tags. A DTD comprises a set of elements and their attributes, as well as a specification of the relationship of each element to other elements. Once an element is defined, it may then be associated with a stylesheet, a script, HTML code or the like. Thus, with XML, an author may define his or her own tags and attributes to identify semantic elements of a document, which may then be validated automatically.

When an application generates XML tags (and corresponding data) for a document according to a particular XML data model and transmits that document to another application that also understands this data model, the XML notation functions as a conduit, enabling a smooth transfer of information from one application to the other. By parsing the tags of the data model from the received document, the receiving application can re-create the information for display, printing, or other processing, as the generating application intended it. Conversely, HTML uses a particular set of predefined tags, and is therefore not a user-extensible language.

XML is a well-formed notation, meaning that all opening tags have corresponding closing tags (with the exception of a special "empty" tag, which is both opened and closed by a single tag, such as "<email/>"), and each tag that nests within another tag is closed before the outer tag is closed. HTML, on the other hand, is not a well-formed notation. Some HTML tags do not require closing tags, and nested tags are not required to follow the strict requirements as described for XML (that is, in HTML a tag may be opened within a first outer tag, and closed within a different outer tag).

XML was optimally supposed to enable semantic search: the ability to distinguish the different senses of a word (such as the chemical, markup, and programming senses of the word "element") and thus find precisely the information of interest. This promise contrasts with the behavior of full text search engines such as Google™, which match all occurrences of the lexical string "element" regardless of sense.

XML provides the ability to mark up the semantics of documents. However, the only way to support a semantic search historically has been to write a search implementation that was sensitive to the custom markup.

More recently, semantic web technologies such as resource description framework (RDF) and TopicMaps have introduced standard ways to represent semantic information with structures suitable for databases. Search implementations have been written for these semantic representations. The semantic web technologies do not, however, provide a way to bridge the gap between the markup of document content and these generic semantic representations.

It can be seen that there is a need for a method, apparatus and program storage device for generating and representing semantic information related to subjects within a knowledge representation.

SUMMARY OF THE INVENTION

To overcome the limitations described above, and to overcome other limitations that will become apparent upon reading and understanding the present specification, the present invention discloses a method, apparatus and program storage device for bridging the gap between the markup of document content and generic semantic representations, e.g., resource description framework (RDF) and TopicMaps.

In accordance with an embodiment of the present invention, a program storage device readable by a computer is provided. The program storage device includes one or more programs of instructions executable by the computer to perform operations for delimiting words. The operations of the program storage device include adding an extensible vocabulary markup to a plurality of markup languages, wherein the plurality of markup languages comprises a knowledge representation, and processing a provided term from one or more vocabularies for use in the knowledge representation.

In another embodiment of the present invention, a device for providing markup language-based delimited words includes a memory for storing data therein, and a processor configured for adding an extensible vocabulary markup to a plurality of markup languages, wherein the plurality of markup languages comprises a knowledge representation, and processing a provided term from one or more vocabularies for use in the knowledge representation.

A processing system in accordance with the principles of the present invention includes means for adding an extensible vocabulary markup to a plurality of markup languages, wherein the plurality of markup languages comprises a knowledge representation, and means for processing a provided term from one or more vocabularies for use in the knowledge representation.

Yet another embodiment of the present invention is a system for providing markup language-based delimited words. The system includes means for providing a memory for storing data therein, means for providing a processor configured for adding an extensible vocabulary markup to a plurality of markup languages, wherein the plurality of markup languages comprises a knowledge representation, and processing a provided term from one or more vocabularies for use in the knowledge representation.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 6 illustrates a method in accordance with an embodiment of the present invention for defining vocabulary elements using broader-narrower relationships;

FIG. 7 is a flowchart of a method for predefining words in a controlled vocabulary in accordance with an embodiment of the present invention;

FIG. 8 is a flowchart of a method in accordance with an embodiment of the present invention for searching using synonyms;

FIG. 9 illustrates yet another method in accordance with an embodiment of the present invention for multiple language searching using translations;

FIG. 10 illustrates another method in accordance with an embodiment of the present invention that accounts for search relevance;

FIG. 11 illustrates a method enabling taxonomic searches in accordance with an embodiment of the present invention; and FIG. 12 illustrates a method that allows for expansion of an embodiment of the present invention through indexing.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

An embodiment of the present invention provides a method, apparatus and program storage device that adds markup for controlled vocabularies to extensible markup languages, thereby allowing words to be marked up in a document as occurrences of terms from vocabularies so that the marked-up words are processed as occurrences of semantic subjects within a knowledge representation.

Figure 1A:
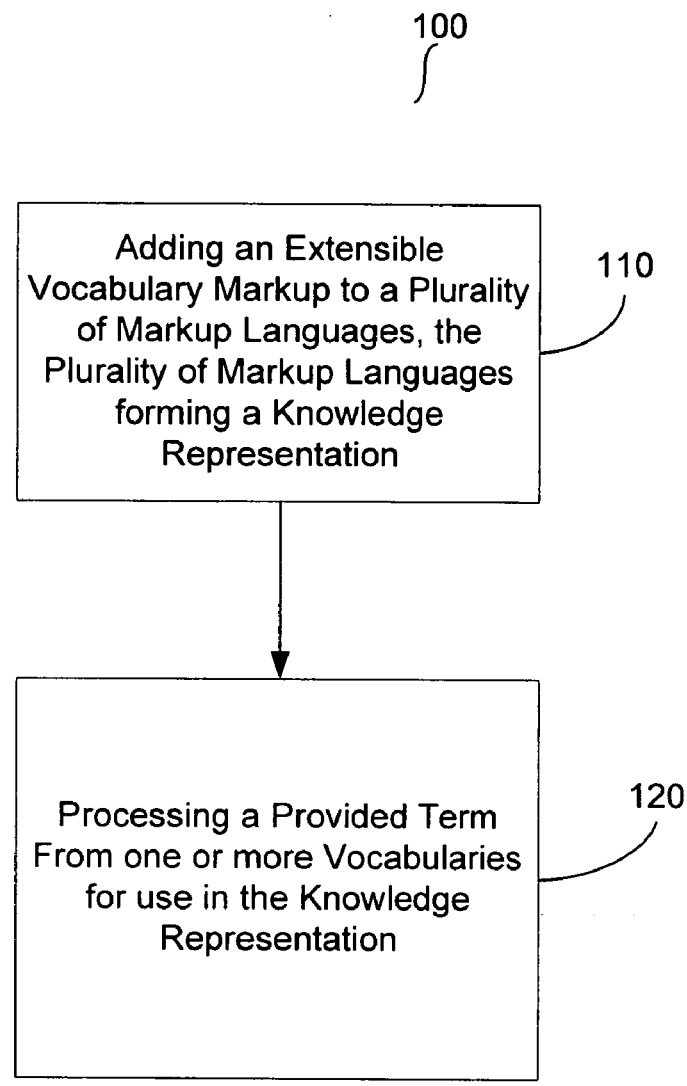
FIG. 1a illustrates a method for delimiting words in accordance with an embodiment of the present invention.

FIG. 1a illustrates a markup language-based method 100 for delimiting words in accordance with an embodiment of the present invention. An extensible vocabulary markup is added 110 to a plurality of markup languages. The plurality of markup languages forms a knowledge representation. A provided term from one or more vocabularies is processed 120 for use in the knowledge representation.

Figure 1B:
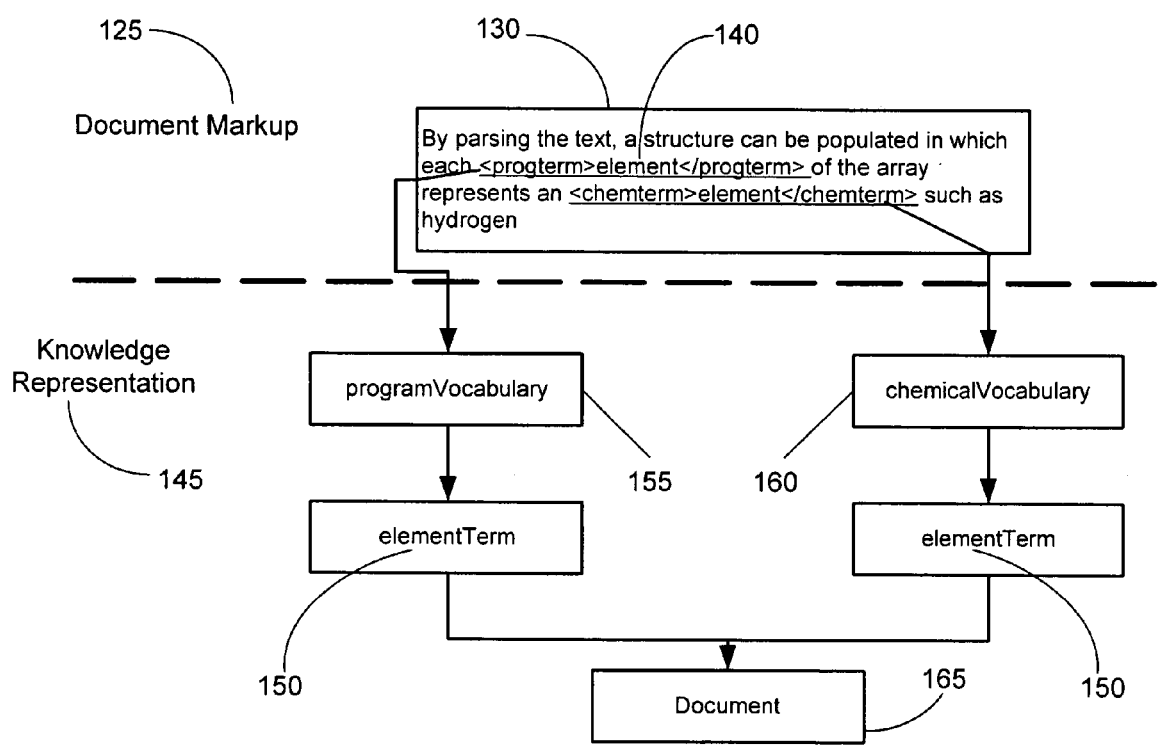
FIG. 1b illustrates a method for producing a knowledge representation from markup languages.

FIG. 1b illustrates a method for producing a knowledge representation from markup languages. In a document markup phase 125, a document is marked up 130 by parsing text in vocabularies, such as the word element 140, which can represent a chemical term, such as hydrogen. Used in the knowledge representation 145, the term element 150 used in the programming array 155 will represent a chemical element from a chemical vocabulary 160 in document 165.

According to an embodiment of the invention, one type of extensible vocabulary markup, Darwin information typing architecture (DITA) XML, can be expressed in an XML grammar such at DTD, XML Schema, Relax NG, or other schema languages. For example, for DITA XML documents, the invention leverages DITA XML documents by utilizing DITA element extensibility so new controlled vocabularies may be added to both the document markup and semantic representation of an existing vocabulary. As a result, information providers gain the added capability of leveraging semantic web technologies to fulfill the XML promise to support semantic search on documents.

A provided word can be marked-up using the added vocabulary element in order to delimit words belonging to a vocabulary. Words belonging to a vocabulary are referred to as terms hereafter. Elements that delimit words from controlled terminologies could include, for example, <xmlterm>element</xmlterm> and <progterm>element</progterm>. The present invention uses DITA domain extensibility to introduce vocabularies where a base element is allowed.

The present invention may use mapping files to define an identifier (ID) within a knowledge representation, such as Resource Description Framework (RDF) or TopicMaps (TM), for the words marked up by a DITA vocabulary element. For example, the following map fragment defines base RDF IDs for the words belonging to the XML and programming vocabularies:

Whether the association between elements is maintained in an external mapping file or in an attribute with a default value, a process such as an Extensible Stylesheet Language Transformation (XSLT) can construct a URI for each delimited term.

While implementing the vocabulary tags, words delimited by the element can be stemmed to consolidate verbal variations to a single term. For example, <xmlterm>element</xmlterm> and <xmlterm>elements</xmlterm> are recognized as occurrences of the same term.

Harvesting the terms (the stemmed words delimited by the vocabulary element) in documents can be used to generate a knowledge representation of each document in which the term occurs. For example, the following RDF fragment contains the generated knowledge representation for the programming vocabulary, the terms belonging to this vocabulary, and the document in which the terms occur:

```
<term:Vocabulary rdf:about="http://www.ibm.com/dita/examples/search/progterm">
    <term:vocabTitle>Programming</term:vocabTitle>
    <term:hasTerm>
        <term:Term rdf:about="http://www.ibm.com/dita/examples/search/progterm#element">
            <term:word>element</term:word>
            <term:occursIn rdf:resource="joblogexample.html"/>
            <term:occursIn rdf:resource="pcmldttg.html"/>
        </term:Term>
    <term:hasTerm>
<term:Vocabulary>.
```

```
<vocab element="progterm">
    <resource>http://www.ibm.com/dita/examples/search/progterm</resource>
    <title>Programming</title>
</vocab>, and
<vocab element= "xmlterm">
    <resource>http://www.ibm.com/dita/examples/search/xmlterm</resource>
    <title>XML</title>
</vocab>.
```

The URI associated with the element can be pre-pended to delimited terms to produce a Uniform Resource Identifier (URI) that can act as a unique, global identifier for the user of the term as a metadata value. Alternatively, the XML grammar may be used to associate a vocabulary element with a URI by means of a defaulted attribute, as in the DTD examples below:

```
<!ELEMENT progterm (#PCDATA)*>
<!ATTLIST progterm
    href CDATA #FIXED
        http://www.ibm.com/dita/examples/search/progterm
    type CDATA #FIXED "Programming"
>, and
<!ELEMENT xmlterm (#PCDATA)*>
<!ATTLIST xmlterm
    href CDATA #FIXED
        http://www.ibm.com/dita/examples/search/xmlterm
    type CDATA #FIXED "XML"
>.
```

Figure 2:
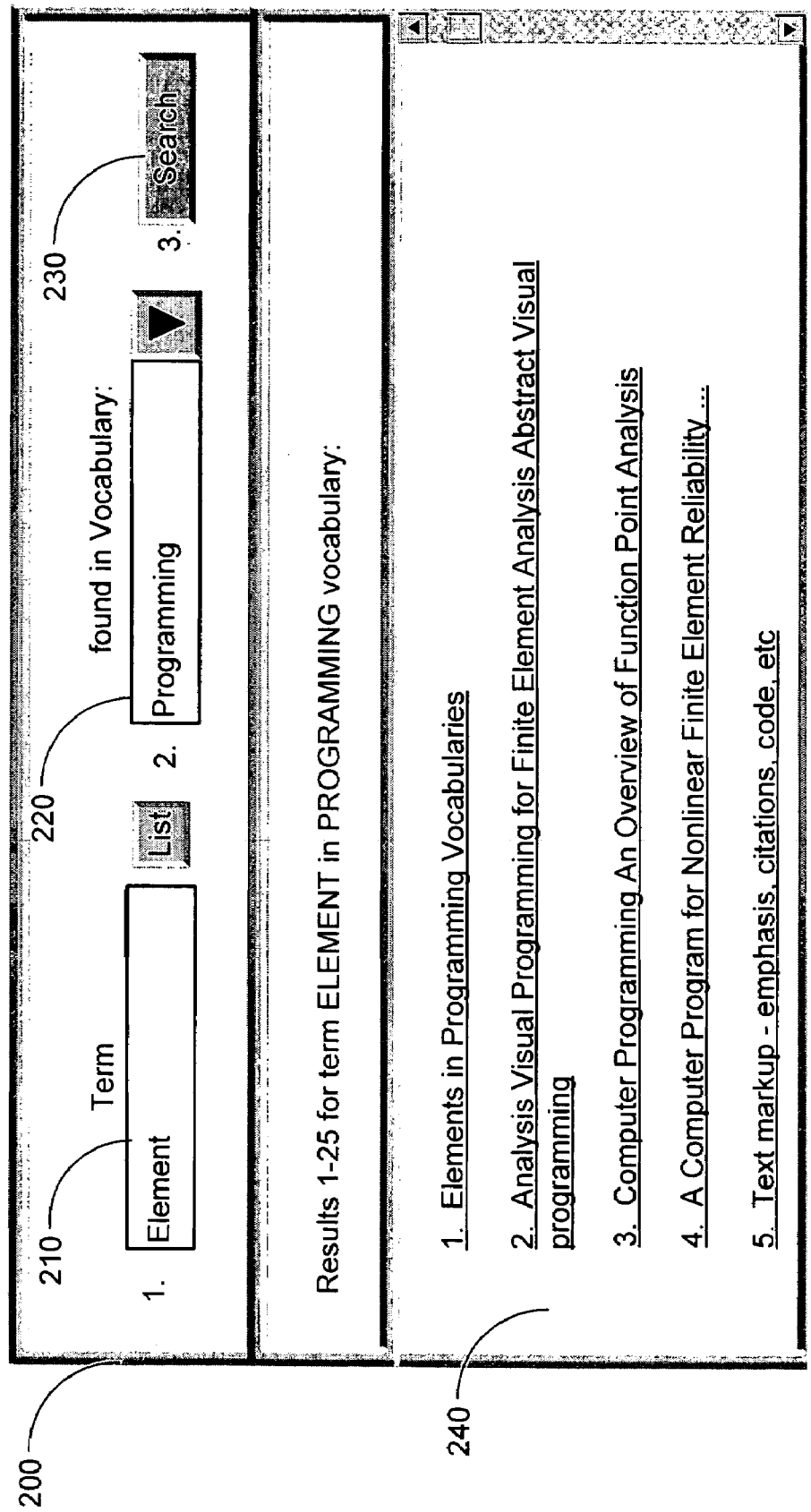
FIG. 2 illustrates a user interface that allows a user to choose the vocabulary or vocabularies in which a search word occurs in accordance with an embodiment of the present invention.

FIG. 2 illustrates a user interface 200 that allows a user to choose the vocabulary or vocabularies in which a search word occurs in accordance with an embodiment of the present invention. The user interface 200 includes a drop-down vocabulary menu 210 and a term field 220. A user can select a vocabulary from the drop-down vocabulary menu 210 and enter a term or terms in term field 210, thereby providing a term with an assigned to the system processing the terms related to domain entities. The system can thereafter conduct a search using the entered and selected search criteria once the search button 230 is selected.

Alternatively, if terms are not selected from a vocabulary-specific list from the drop-down vocabulary menu 210, stemming can be used as a default, for example, to reduce the search words to terms. Matching data, such as documents based on terms provides greater precision for a search compared to matching documents based on lexical words. Additionally, terms within a vocabulary can be used for associative linking between documents in which the same term occurs.

Continuing with FIG. 2, once search criteria are entered, a search can be conducted and a search results list 240 displayed. The matching documents can then be selected and displayed (not shown).

Figure 3:
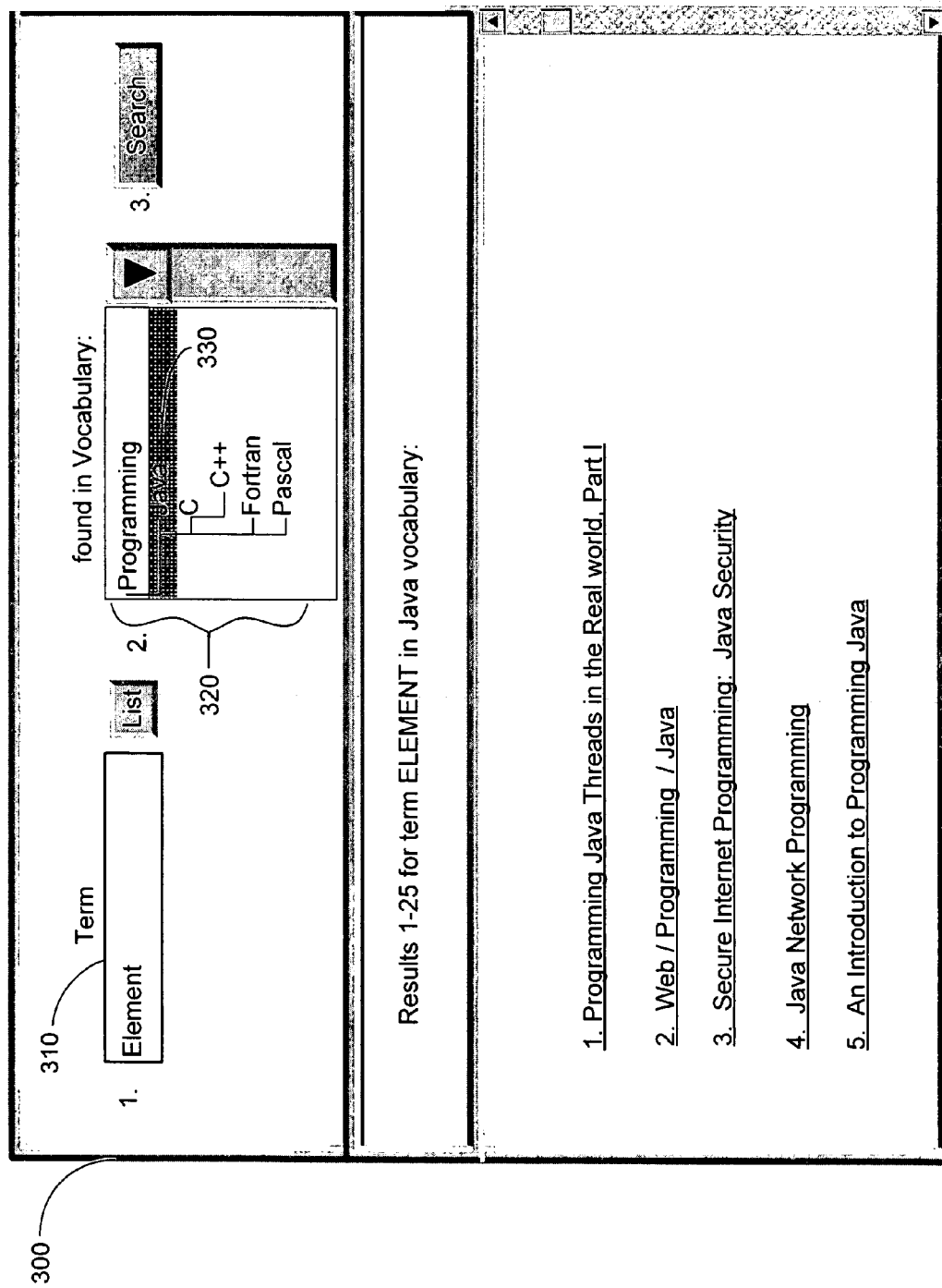
FIG. 3 illustrates an alternative user interface 300 that allows vocabularies to be arranged in broader-narrower hierarchies in accordance with an embodiment of the present invention.

FIG. 3 illustrates an alternative user interface 300 that allows vocabularies to be arranged in broader-narrower hierarchies in accordance with an embodiment of the present invention. As a query word is typed in a term box 310, the application can autocomplete words by listing matching terms associated with the portion of the word provided. Matching can be based on a type of vocabulary selected from a vocabulary tree. Vocabulary tree 320 lists a broader-narrower hierarchy with the broad programming vocabulary first, followed by narrower Java, C, Fortran and Pascal programming vocabularies. The C programming vocabulary is further narrowed to the C++ programming vocabulary. When a vocabulary is selected, the list of terms or words listed for autocompletion can be narrowed according to the vocabulary selected. Alternatively, autocompletion can proceed by first completing a term and then following with a list of vocabularies matching the completed term for selection. Still further, autocompletion for both the term and vocabulary can be used. As a portion of the word is typed, both terms and vocabularies are listed. When either a term or vocabulary is selected, the program can narrow the unselected criteria to match the selected vocabulary or term. Then the user can select the narrowed second criteria. Vocabularies and terms can be changed and the matching list of vocabularies or terms can be refreshed according to the new criteria. Thus, when a narrow vocabulary is selected compared to the previously selected vocabulary, the number of terms matching the provided term or portion of the term will narrow. In contrast, selecting a broader vocabulary compared to the previously selected vocabulary will yield a broader number of terms. In this example completing a term would be similar to word completion using a dictionary-backed word processing program, but terms would be completed from a specific Java vocabulary 330. Autocompletion can be manually or automatically triggered.

Figure 4:
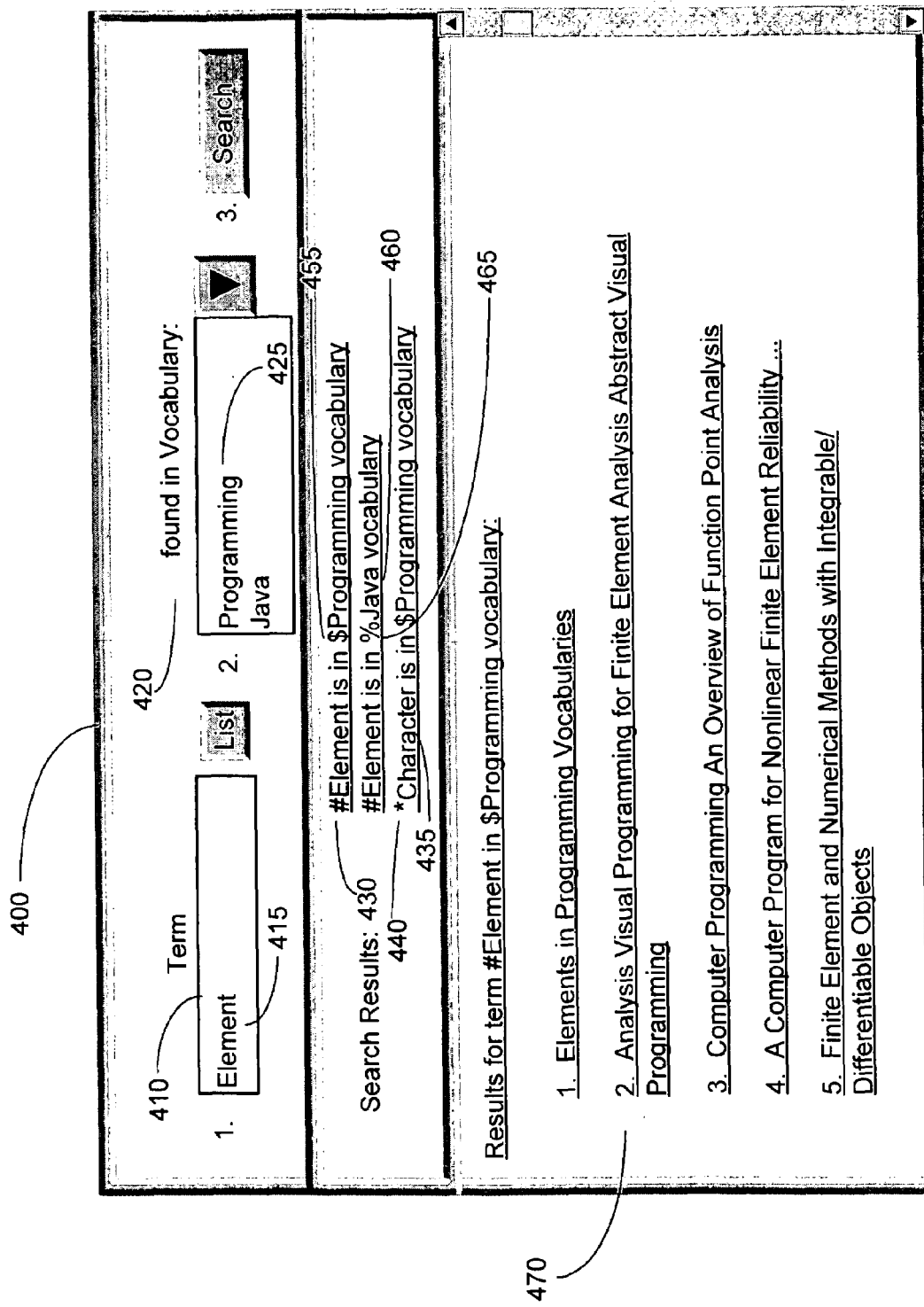
FIG. 4 illustrates a user interface that includes a framework that allows for autocompletion of query words in accordance with an embodiment of the present invention.

FIG. 4 illustrates a user interface 400 that includes a framework that allows for autocompletion of query words in accordance with an embodiment of the present invention. As a term is typed in the term field 410 of user interface 400 of FIG. 4, and where the same word has different meanings in different vocabularies, a list of potential vocabularies is displayed in the vocabulary field 420. Typically, one or more selected vocabularies are associated with the query word. When the query word is not found in any vocabulary, and thus no matching terms are available, the word could be underlined similar to the identification of unknown words in a dictionary-backed word processing program. For especially large vocabularies, where a large number of matches for the entered term or terms are found, the terms could be displayed in a list for selection similar to index mechanisms in the help systems such as JavaHelp.

Once a term associated with a vocabulary has been entered, an icon or symbol placed before the term could represent the associated vocabulary and provide a clickable mechanism for keeping the same term but changing the vocabulary, keeping the same term but adding a vocabulary, or replacing the term with a different term from the same or different vocabulary. FIG. 4 associates the "#" symbol 430 with the term Element 415. A synonym or term associated with the term Element 415 such as Character 435 is assigned the "*" symbol 440. Similarly, a selected Programming 425 vocabulary can be associated with the "$" symbol 455. Specific types of programming vocabularies can be associated with other symbols. Java 460, for example, can be associated with the "%" symbol 465. Thus, terms associated with the entered Element 415 term, such as Character 435, can be displayed in user interface 400 in accordance with an embodiment of the present invention. Furthermore, vocabularies having a broader or narrower scope can be displayed on user interface and can have symbols associated with them. Accordingly, the user interface allows a user to quickly switch between associated terms and between associated vocabularies and it is also possible to generate links automatically between marked up terms. Results for a particular term associated with a particular vocabulary can be displayed in a display area 470.

Figure 5:
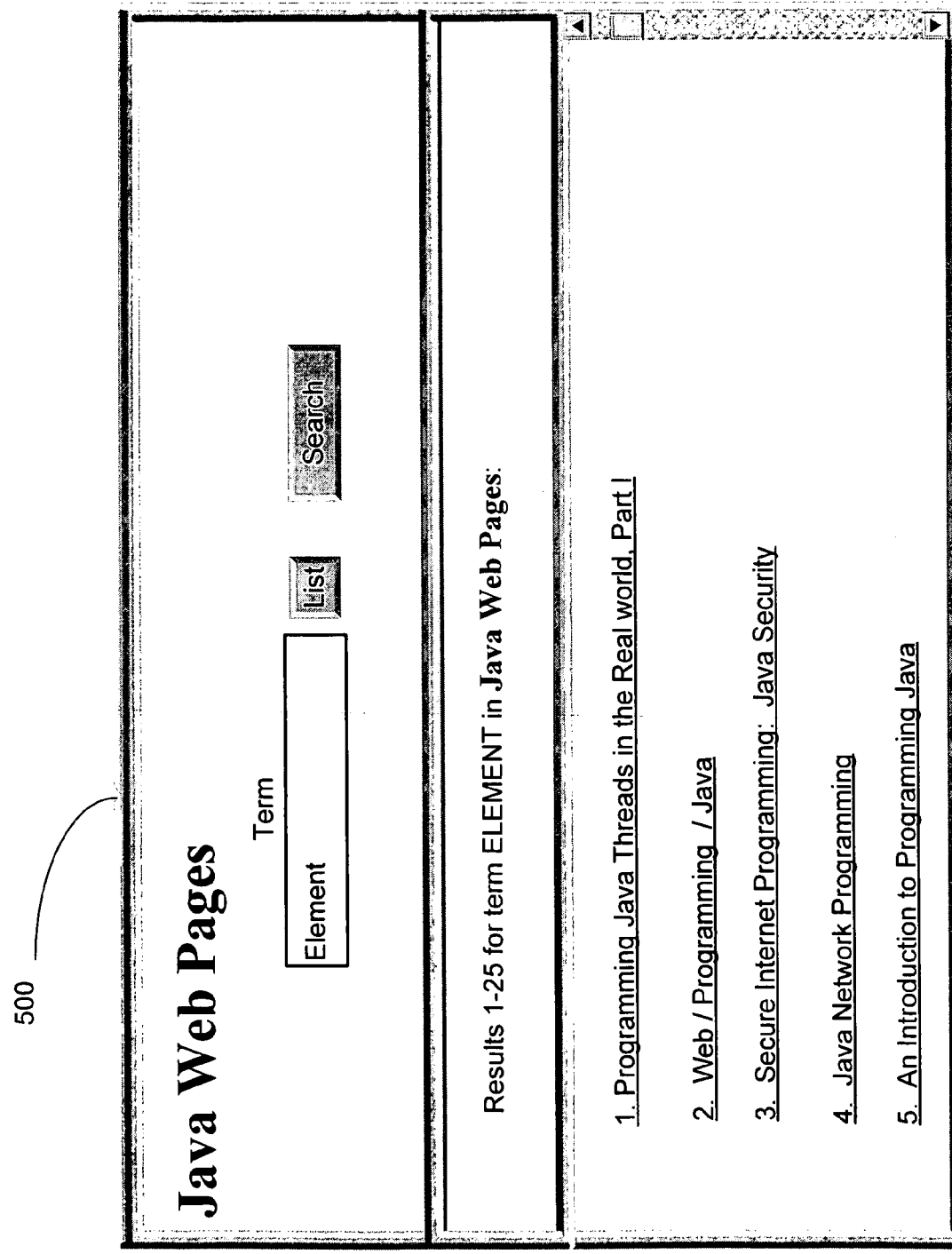
FIG. 5 is an illustration of a user interface having an implicit markup languages set by using a web page for each subject domain in accordance with an embodiment of the present invention.

FIG. 5 is an illustration of a user interface having an implicit vocabulary set by using a web page 500 for each subject domain in accordance with an embodiment of the present invention. Web page 500 is navigated using a web browser directed to the appropriate subject domain, e.g., Java web pages. Autocompletion can be applied allowing completion of a partially entered query word based on the web page's designated vocabulary (including narrower vocabularies) for the subject domain. Unlike autocompletion against spelling dictionaries, query word autocompletion would allow for multiword terms. Where a word matches the first word in a multiword term, the matching algorithm can treat the space provisionally as a word character instead of a word boundary but revert to treating the space as a word boundary if the match fails.

FIG. 6 illustrates a method 600 in accordance with an embodiment of the present invention for using extensible vocabulary markup to define vocabulary elements using broader-narrower relationships. DITA specialization can be used to define 610 vocabulary elements with broader-narrower relationships, and in this way can then be asserted between vocabularies in a generated knowledge representation. Broader-narrower relationships are asserted 620 in a generated knowledge representation for vocabulary elements. In accordance with an embodiment of the present invention, when running a search with a term from a vocabulary, documents with occurrences of the search words within the vocabulary and within a narrower vocabulary are matched 630. For example, a search on the word "element" in a programming vocabulary would also match an occurrence of "element" in a Java programming vocabulary. This expansion can be implemented by indexing a term from a narrower vocabulary within its broader vocabularies as well. Alternatively, the search can check the indexes for narrower vocabularies as well as the vocabulary for the search criteria and merge the results.

FIG. 7 is a flowchart of a method 700 for predefining words in a controlled vocabulary in accordance with an embodiment of the present invention. The knowledge representation of the terms (vocabulary and words) can be predefined 710 as a controlled vocabulary. This can extend the vocabulary because more information is available compared to the generated knowledge representation from the document words. The basic method can instead be used to define 720 a vocabulary element and the elements can be mapped 730 to a set of terms including pre-defined terms in the knowledge representation. Words can be stemmed in order to recognize words as instances of terms. Where the delimited word does not match a pre-defined term, error handling can be provided either by an editing tool or by a build utility to ensure 740 the document is valid. Generation of the knowledge representation for term occurrences within documents is the same as in the basic method.

FIG. 8 is a flowchart of method 800 in accordance with an embodiment of the present invention that allows for searching using synonyms. In the map for a vocabulary, known synonym words can be predefined as term equivalents 810. The predefined synonym words can be mapped 820 to equivalent terms. Document words are stemmed 830 as in the basic method. A determination is made whether the stemmed document word has a synonym 840, if so, the synonym is substituted 850 with the term word and processed in the same way as in the basic method. Where the stemmed document word does not have a synonym, the stemmed document words are processed normally 860. In accordance with the invention, when performing a search, the search criteria word entered can be checked for a synonym. If a synonym is present, the search criteria word can be replaced with the term word before matching documents, thereby ensuring that synonyms will match the same meaning and thus the same documents.

FIG. 9 illustrates yet another method 900 in accordance with an embodiment of the present invention that allows for multiple language searching using translations. In the map for a vocabulary, native language words can be mapped 910 to terms (semantic subjects) and processed 920 as in the extension for synonyms. When processing the criteria, replace 930 native language words with terms (semantic subjects) and process 940 as in the extension for synonyms. Thus, a search in one language can match documents in multiple languages with greater semantic precision than with automated translation software. As a result, speakers of multiple languages can compose search criteria in their preferred language and receive documents in their preferred language where possible, and receive documents in English if documents in the other languages are unavailable.

FIG. 10 illustrates another method 1000 in accordance with an embodiment of the present invention that accounts for search relevance. A unique number or weight is assigned 1010 to each term, whether from a controlled or uncontrolled vocabulary, possibly by combining a unique number for the vocabulary with a unique number for the term word. The terms in the documents (instead of words) are indexed 1020 using any full text search algorithm. For example, the documents can be indexed with a vector space search algorithm, representing each term with a number so that the same lexical word may be represented as two completely different terms. The result is that each sense of the word would be a different vector. When performing a search, the search words are converted to numbers using the same scheme and documents are matched using the numbers by applying the standard full text search algorithm. Better accuracy than lexical full text search results.

FIG. 11 illustrates how a method 1100, in accordance with an embodiment of the present invention, may enable taxonomic searches. In the knowledge representation for a controlled vocabulary, a broader-narrower relationship is defined 1110 between controlled terms in different vocabularies. For example, a programming "set" might be the broader term for a Java "hash." When running a search on a term, documents with the term and documents with narrower terms are matched 1120 and the results can be merged 1130. For example, a search on the term "set" in the programming vocabulary might also match the term "hash" in the Java vocabulary. The results for "set" and "hash" can be merged and displayed on the user interface.

FIG. 12 illustrates a method 1200 that allows for expansion of an embodiment of the present invention through indexing. Instances of terms are indexed 1210 as an instance of its broader terms and documents are matched 1220 according to the instance of the broader terms. Alternatively, the search can look for narrower terms in addition to the search term and merge the results.

Accordingly, document content may be extractable and expressed as a knowledge representation, thus avoiding laborious and error-prone maintenance of metadata.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device, comprising: program instructions executable by a processing device to perform operations for delimiting words, the operations comprising:

adding an extensible vocabulary markup to a plurality of markup languages, each markup language having an associated vocabulary of terms, wherein said adding includes using said extensible vocabulary markup to markup terms of a document of a plurality of documents as occurrences of terms from said vocabularies of said markup languages so that each term of a document marked up using said extensible vocabulary markup is delimited as belonging to a vocabulary of said vocabularies;

processing a provided term from one or more of said vocabularies, said processing including generating a knowledge representation of a particular document of said plurality of documents in which the provided term occurs, said knowledge representation including an identification of a particular vocabulary of said vocabularies, said particular vocabulary having the provided term, said knowledge representation further including the provided term belonging to the particular vocabulary and an identification of the particular document in which the provided term occurs;

processing an additional provided term from an additional vocabulary of said vocabularies so that said knowledge representation of said particular document further includes an identification of said additional vocabulary of said vocabularies, and the additional provided term belonging to the additional vocabulary;

inputting one of the provided terms as a search term;

selecting said particular vocabulary in which the provided term occurs from said plurality of vocabularies; and retrieving a plurality of documents including said particular document, each retrieved document having said inputted provided term belonging to said selected particular vocabulary, said retrieving including processing said knowledge representation to identify said particular document having said inputted provided term belonging to said selected particular vocabulary.

2. The program storage device of claim 1, wherein adding the extensible vocabulary markup to the plurality of markup languages comprises adding an extensible vocabulary markup to a plurality of markup languages through DITA specialization in DTD.

3. The program storage device of claim 1, wherein adding the extensible vocabulary markup to the plurality of markup languages comprises adding an extensible vocabulary markup to a plurality of markup languages through XML Schema or Relax NG.

4. The program storage device of claim 1, wherein the one or more vocabularies are included within a subject domain.

5. The program storage device of claim 1, wherein the one or more vocabularies comprises one or more vocabularies defined using mapping.

6. The program storage device of claim 5, wherein the one or more vocabularies defined using mapping comprises one or more vocabularies defined using a map of RDF IDs.

7. The program storage device of claim 5, wherein the one or more vocabularies defined using mapping comprises one or more vocabularies defined using a fixed attribute for a semantic URI, wherein the semantic URI is associated with a fixed attribute for a vocabulary.

8. The program storage device of claim 1, wherein processing the provided term comprises processing a provided term based on a provided word associated with the term.

9. The program storage device of claim 1, wherein processing the provided term comprises processing a provided term that is a synonym of the provided word.

10. The program storage device of claim 1, wherein processing the provided term from the one or more vocabularies comprises processing a provided term as a term with an assigned vocabulary.

11. The program storage device of claim 1, wherein the provided term comprises a stemmed term.

12. The program storage device of claim 1, wherein processing the provided term from the one or more vocabularies for use in the knowledge representation comprises: processing a portion of a provided term; initiating autocompletion, wherein autocompletion identifies one or more terms having the portion of the provided term; displaying the identified one or more terms; and receiving a completed term.

13. The program storage device of claim 1, further comprising retrieving data associated with the provided term within at least one of the one or more vocabularies.

14. The program storage device of claim 13, wherein retrieving the data associated with the term comprises retrieving a plurality of documents associated with the term.

15. The program storage device of claim 13, wherein retrieving the data associated with the term comprises inferring associative links between documents associated with the term.

16. The program storage device of claim 13, wherein retrieving the data associated with the term comprises retrieving data from a vocabulary, wherein the term is associated with a vocabulary that is a subset of the vocabulary by which data is to be retrieved.

17. The program storage device of claim 13, wherein retrieving data associated with the term comprises retrieving data from a subset of the vocabulary.

18. The program storage device of claim 13, wherein retrieving data associated with the term comprises retrieving data from one or more vocabularies.

19. The program storage device of claim 13, further comprising associating a weight with the data retrieved based on the relation the retrieved data has with the term.

20. A program storage device, comprising program instructions stored thereon and executable by a processing device to perform operations, the operations comprising:

adding an extensible vocabulary markup to a plurality of markup languages, each markup language having an associated vocabulary of terms, wherein said adding includes using said extensible vocabulary markup to markup terms of a document of a plurality of documents as occurrences of terms from said vocabularies of said markup languages so that each term of a document marked up using said extensible vocabulary markup is delimited as belonging to a vocabulary of said vocabularies;

processing a provided term from one or more of said vocabularies, said processing including generating a knowledge representation of a particular document of said plurality of documents in which the provided term occurs, said knowledge representation including an identification of a particular vocabulary of said vocabularies, said particular vocabulary having the provided term, said knowledge representation further including the provided term belonging to the particular vocabulary and an identification of the particular document in which the provided term occurs, said processing further including assigning a unique number to the provided term in the knowledge representation wherein the unique number is a combination of a unique number for the particular vocabulary and a unique number for the term of the provided term, and indexing the particular document with a vector space search algorithm wherein the provided term is represented as a vector as a function of the assigned unique number;

processing an additional provided term from an additional vocabulary of said vocabularies so that said knowledge representation of said particular document further includes an identification of said additional vocabulary of said vocabularies, and the additional provided term belonging to the additional vocabulary;

defining a broader-narrower relationship between the provided term of the particular vocabulary and a more narrow term which is an additional provided term from an additional vocabulary;

inputting one of the provided terms as a search term;

selecting said particular vocabulary in which the provided term occurs from said plurality of vocabularies;

assigning said unique number to the provided search term; and retrieving a plurality of documents including said particular document using said vector space search algorithm, a retrieved document having said inputted provided search term belonging to said selected particular vocabulary, said retrieving including processing said knowledge representation to identify said particular document having said inputted provided search term belonging to said selected particular vocabulary, and matching said assigned unique number assigned said search term, and said retrieved documents further including a document having said more narrow term, said retrieving including processing said knowledge representation to identify documents having the more narrow term and merging the results of said knowledge representation processing to provide retrieved documents having at least one of said inputted provided search term and said more narrow term.

* * * * *